L. C. MARTIN.
EYEGLASS CONSTRUCTION.
APPLICATION FILED FEB. 20, 1915.

1,278,190.

Patented Sept. 10, 1918.

Witnesses:
Fred Rorger
H. J. Brunjes

Inventor
L. C. Martin
By his Attorneys
Blair & Nathan

UNITED STATES PATENT OFFICE.

LAURENCE C. MARTIN, OF PROVIDENCE, RHODE ISLAND.

EYEGLASS CONSTRUCTION.

1,278,190.      Specification of Letters Patent.      Patented Sept. 10, 1918.

Application filed February 20, 1915. Serial No. 9,747.

*To all whom it may concern:*

Be it known that I, LAURENCE C. MARTIN, a citizen of the United States, and residing at Providence, in the county of Providence and State of Rhode Island, have invented a new and Improved Eyeglass Construction, of which the following specification is a full disclosure.

This invention relates to eyeglass construction. One of the objects thereof is to provide simple and practical means for securing a lens clamp to an eyeglass lens. Another object is to provide means of the above type to be quickly and conveniently applied, and which will yet hold the lens securely in position. Other objects will be in part obvious and in part pointed out hereafter.

The invention accordingly consists in the features of construction, combinations of elements and arrangement of parts which will be exemplified in the construction hereinafter described, and the scope of the application of which will be indicated in the following claims.

In the accompanying drawings wherein is shown one of various possible embodiments of this invention Figure 1 is a front elevation of a lens with a clamp and associated parts mounted thereon.

Similar reference characters refer to similar parts throughout the various views of the drawings.

Figure 1:
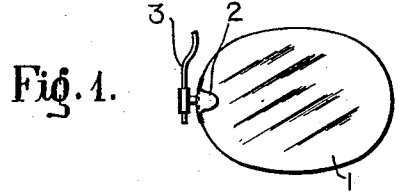

Referring now to Fig. 1 of the drawings, there is shown at 1 an eyeglass lens having mounted thereon by means of the lens clamp 2 a bow spring 3, it being understood that this invention is applicable to all types of eyeglasses, and that the term "eyeglass" as used herein is intended to denote any device adapted to mount lenses before the eyes, whether of the spectacle form or otherwise.

Figure 2:
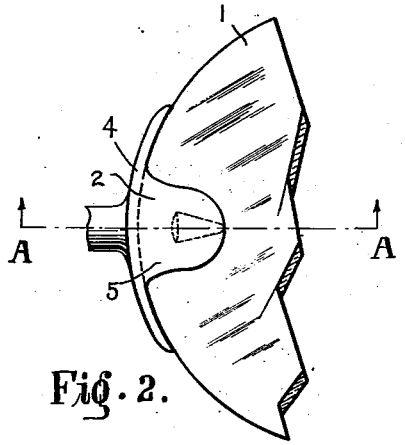
Fig. 2 is a similar view of certain parts shown in Fig. 1 upon a larger scale.
Figure 4:
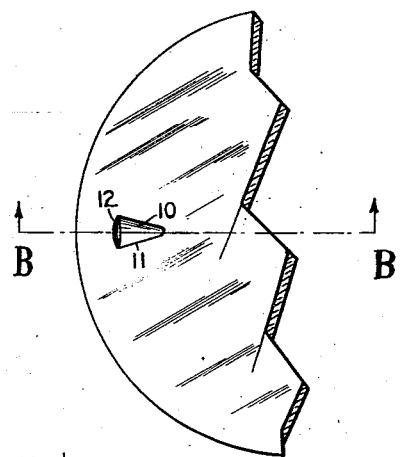
Fig. 4 is an elevation of a portion of a lens free from the clamp.
Figure 6:
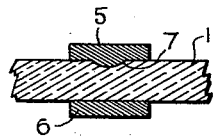
Fig. 6 is a sectional view taken along the lines C—C of Fig. 3.
Figure 3:
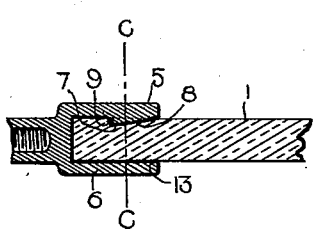
Fig. 3 is a sectional view taken along the lines A—A of Fig. 2.

Referring to Fig. 2, it will be seen that the lens clamp 2 comprises a strap portion 4, and a pair of side wings or lugs 5 and 6. Upon the inner surface of the lug 5 is formed a projection or irregularity 7, the surface of the portion 8 of which is cylindrical with respect to an inclined axis, and the portion 9 of which forms an abrupt shoulder. Formed in the upper surface of the lens adjacent its end edge is a recess 10, the portion 11 of which is formed to fit the portion 8, the portion 12 forming a shoulder adapted to interlock with the shoulder 9.

Considering the above mechanical structure, it may be noted that the recess or depression 10 formed in the surface of the lens rigidly interlocks with the projection 7 to hold the clamp securely in position. It may also be noted that the term "lens clamp" is used throughout in a broad sense as covering any connecting device adapted to be secured to the edge of an eyeglass lens.

There is provided within the lens clamp 2 a lining 13 of cement, which is of a strongly adhesive nature, and preferably is of that type which is softened for application by heat. This cement not only fills up any minute interstices between the surface of the lens and the portions of the clamp, but rigidly holds all meeting surfaces together, and in particular prevents movement of the side lug 5 in a direction away from the corresponding surface of the lens. There is thus provided means which not only interlock in holding the clamp in position, but additional means which prevents movement in the single direction by which this interlocking relation can be broken.

Figure 5:
Fig. 5 is a sectional view taken along the lines B—B of Fig. 4.

The device is preferably applied by heating the clamp until the cement lining thereof softens and thereupon slipping it over the edge of the lens until the projection 7 snaps into place in the depression 10. Movement of the clamp with respect to the lens in this direction is readily permitted, due to the shape of the projection 7, and hence it is substantially unnecessary to press the side lugs toward the glass after the clamp is in position. The cooling of the cement thereupon hardens the same, and there is provided a joint of extreme reliability, for the parts are interlocked against movement in any direction and tenaciously held in this interlocking relation. When, however, it is desired to remove the clamp, as in the case of a broken lens, the former is heated and thereupon pulled away from the lens, the side lug 5 being pried upwardly if necessary to release its hooked engagement with the glass. It may be noted that if the latter action is necessary, the clamp may quickly be bent into its original position. It may also be noted that the recess 10 may readily be formed in the glass by means of using a round drill in the position indicated in dotted lines in Fig. 5 of the drawings.

It will thus be seen that there is provided a construction in which the several objects of this invention are achieved, and in which the various parts, although readily and conveniently assembled and simple in individual construction are, nevertheless, tenaciously held in assembled relation.

As many changes might be made in the above construction, and as many apparently different embodiments might be made of this invention without departing from the scope thereof, it is intended that all features herein described or shown in the accompanying drawings shall be interpreted as illustrative and not in a limiting sense.

Having thus revealed this invention, I claim as new and desire to secure the following combinations of elements, or equivalents thereof, by Letters Patent of the United States:—

In eyeglass construction, in combination, a lens having formed in its surface adjacent an edge a recess or depression comprising a surface sloping gradually downwardly toward said edge and a surface extending abruptly in an upward direction to form a wall facing away from said edge, and a lens clamp one of the side lugs of which is provided on its inner surface with a projection shaped to fit said recess whereby said clamp is readily moved upon said lens into interlocking position and rigidly held in such position.

In witness whereof, I hereunto subscribe my name, as attested by the two subscribing witnesses.

LAURENCE C. MARTIN.

Witnesses:
SIDNEY D. HUMPHREY,
RUSSELL W. WRIGHT.